United States Patent
Hayashi et al.

(10) Patent No.: US 11,003,647 B2
(45) Date of Patent: May 11, 2021

(54) MULTIDIMENSIONAL DATA MANAGEMENT SYSTEM AND MULTIDIMENSIONAL DATA MANAGEMENT METHOD

(71) Applicant: Hitachi, Ltd., Tokyo (JP)

(72) Inventors: Hideki Hayashi, Tokyo (JP); Akinori Asahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 492 days.

(21) Appl. No.: 15/883,135

(22) Filed: Jan. 30, 2018

(65) Prior Publication Data
US 2019/0042612 A1 Feb. 7, 2019

(30) Foreign Application Priority Data
Aug. 3, 2017 (JP) .............................. JP2017-150790

(51) Int. Cl.
  *G06F 16/30* (2019.01)
  *G06F 16/22* (2019.01)
  *G06F 16/2455* (2019.01)
  *G06F 16/28* (2019.01)

(52) U.S. Cl.
CPC ...... *G06F 16/2264* (2019.01); *G06F 16/2455* (2019.01); *G06F 16/283* (2019.01)

(58) Field of Classification Search
CPC .............. G06F 16/2264; G06F 16/2455; G06F 16/283
USPC ........ 707/609, 687, 705, 769, 790, 813, 821
See application file for complete search history.

(56) References Cited

U.S. PATENT DOCUMENTS

| | | | | |
|---|---|---|---|---|
| 5,864,857 | A | * | 1/1999 | Ohata .................. G06F 16/2264 |
| 6,954,760 | B2 | * | 10/2005 | Yamashita ............ G06F 16/283 707/694 |
| 2005/0171972 | A1 | | 8/2005 | Goldstein et al. |

FOREIGN PATENT DOCUMENTS

JP  2007-521565 A  8/2007

* cited by examiner

*Primary Examiner* — Sana A Al-Hashemi
(74) *Attorney, Agent, or Firm* — Mattingly & Malur, PC (57) ABSTRACT

The multidimensional data management system for speedily registering and searching multidimensional data includes: a central processing unit and a storage device that stores the multidimensional data including the respective values of plural dimensions, and multidimensional management data associating the ranges of the respective values of plural dimensions with character strings. The central processing unit obtains the respective values of a plurality of dimensions included in each multidimensional data; obtains the ranges of the respective values of a plurality of dimensions defined in the multidimensional management data within which the obtained respective values of the plurality of dimensions fall respectively; obtains character strings associated with the obtained ranges of the respective values of the plurality of dimensions in the multidimensional management data; couples the obtained character strings; and associates the coupled character strings with each multidimensional data, and stores each multidimensional data with the coupled character strings.

12 Claims, 10 Drawing Sheets

| | 112a | 112b | 112c | 112 112d |
|---|---|---|---|---|
| DIMENSION NAME | MINIMUM VALUE | MAXIMUM VALUE | CODE |
| DIM-1 | 1 | 10 | 00 |
| DIM-1 | 11 | 20 | 01 |
| DIM-1 | 21 | 30 | 02 |
| DIM-2 | 1 | 10 | 00 |
| DIM-2 | 11 | 20 | 01 |
| DIM-2 | 21 | 30 | 02 |
| DIM-3 | 1 | 10 | 00 |
| DIM-3 | 11 | 20 | 01 |
| DIM-3 | 21 | 30 | 02 |

FIG. 4

| DIM-1 | DIM-2 | DIM-3 | PHYSICAL QUANTITY |
|---|---|---|---|
| 1 | 9 | 6 | 5.2 |
| 9 | 8 | 13 | 9 |
| 4 | 7 | 26 | 9.1 |
| 9 | 20 | 2 | 7.5 |
| 2 | 18 | 17 | 3.5 |
| 6 | 16 | 21 | 5.3 |
| 1 | 25 | 6 | 3.4 |
| 3 | 28 | 11 | 9 |
| 7 | 23 | 30 | 0.9 |
| 15 | 3 | 5 | 0.4 |
| 20 | 9 | 18 | 6.5 |
| 15 | 5 | 26 | 9 |
| 16 | 15 | 2 | 1.3 |
| 15 | 11 | 15 | 4 |
| 20 | 12 | 24 | 7 |
| 14 | 25 | 5 | 9 |
| 17 | 27 | 19 | 3.1 |
| 10 | 22 | 26 | 0.6 |
| 24 | 7 | 3 | 8.1 |
| 29 | 9 | 18 | 2.8 |
| 29 | 8 | 21 | 9 |
| 22 | 20 | 7 | 9.9 |
| 25 | 17 | 14 | 3.2 |
| 29 | 10 | 28 | 0.7 |
| 21 | 20 | 6 | 2.6 |
| 29 | 21 | 11 | 8.5 |
| 21 | 30 | 25 | 6.8 |

| MULTIDIMENSIONAL CODE | DIM-1 | DIM-2 | DIM-3 | PHYSICAL QUANTITY |
|---|---|---|---|---|
| 00:00:00 | 1 | 9 | 6 | 5.2 |
| 00:00:01 | 9 | 8 | 13 | 9 |
| 00:00:02 | 4 | 7 | 26 | 9.1 |
| 00:01:00 | 9 | 20 | 2 | 7.5 |
| 00:01:01 | 2 | 18 | 17 | 3.5 |
| 00:01:02 | 6 | 16 | 21 | 5.3 |
| 00:02:00 | 1 | 25 | 6 | 3.4 |
| 00:02:01 | 3 | 28 | 11 | 9 |
| 00:02:02 | 7 | 23 | 30 | 0.9 |
| 01:00:00 | 15 | 3 | 5 | 0.4 |
| 01:00:01 | 20 | 9 | 18 | 6.5 |
| 01:00:02 | 15 | 5 | 26 | 9 |
| 01:01:00 | 16 | 15 | 2 | 1.3 |
| 01:01:01 | 15 | 11 | 15 | 4 |
| 01:01:02 | 20 | 12 | 24 | 7 |
| 01:02:00 | 14 | 25 | 5 | 9 |
| 01:02:01 | 17 | 27 | 19 | 3.1 |
| 01:02:02 | 10 | 22 | 26 | 0.6 |
| 02:00:00 | 24 | 7 | 3 | 8.1 |
| 02:00:01 | 29 | 9 | 18 | 2.8 |
| 02:00:02 | 29 | 8 | 21 | 9 |
| 02:01:00 | 22 | 20 | 7 | 9.9 |
| 02:01:01 | 25 | 17 | 14 | 3.2 |
| 02:01:02 | 29 | 10 | 28 | 0.7 |
| 02:02:00 | 21 | 20 | 6 | 2.6 |
| 02:02:01 | 29 | 21 | 11 | 8.5 |
| 02:02:02 | 21 | 30 | 25 | 6.8 |

| MULTIDIMENSIONAL CODE | DIM-1 | DIM-2 | DIM-3 | PHYSICAL QUANTITY |
|---|---|---|---|---|
| 00:00:00 | 1 | 9 | 6 | 5.6 |
| ... | ... | ... | ... | ... |
| 00:02:02 | 7 | 23 | 30 | 5.9 |
| 01:00:00 | 15 | 3 | 5 | 5.3 |
| 01:00:01 | 20 | 9 | 18 | 6.2 |
| 01:00:02 | 15 | 5 | 26 | 2.8 |
| 01:01:00 | 16 | 15 | 2 | 3 |
| 01:01:01 | 15 | 11 | 15 | 4.2 |
| 01:01:02 | 20 | 12 | 24 | 6.6 |
| 01:02:00 | 14 | 25 | 5 | 8.9 |
| 01:02:01 | 17 | 27 | 19 | 7.3 |
| 01:02:02 | 10 | 22 | 26 | 5.4 |
| 02:00:00 | 24 | 7 | 3 | 1.8 |
| ... | ... | ... | ... | ... |
| 02:02:02 | 21 | 30 | 25 | 6.7 |

| MULTIDIMENSIONAL CODE | DIM-1 | DIM-2 | DIM-3 | PHYSICAL QUANTITY |
|---|---|---|---|---|
| 00:00:00 | 1 | 9 | 6 | 5.2 |
| ... | ... | ... | ... | ... |
| 00:02:02 | 7 | 23 | 30 | 0.9 |
| 01:00:00 | 15 | 3 | 5 | 0.4 |
| 01:00:01 | 20 | 9 | 18 | 6.5 |
| 01:00:02 | 15 | 5 | 26 | 9 |
| 01:01:00 | 16 | 15 | 2 | 1.3 |
| 01:01:01 | 15 | 11 | 15 | 4 |
| 01:01:02 | 20 | 12 | 24 | 7 |
| 01:02:00 | 14 | 25 | 5 | 9 |
| 01:02:01 | 17 | 27 | 19 | 3.1 |
| 01:02:02 | 10 | 22 | 26 | 0.6 |
| 02:00:00 | 24 | 7 | 3 | 8.1 |
| ... | ... | ... | ... | ... |
| 02:02:02 | 21 | 30 | 25 | 6.8 |

$$\sqrt{(0.4-5.3)^2+(9-2.8)^2+(4-4.2)^2+(9-8.9)^2}=7.9$$

MULTIDIMENSIONAL DATA MANAGEMENT SYSTEM AND MULTIDIMENSIONAL DATA MANAGEMENT METHOD

CLAIM OF PRIORITY

The present application claims priority from Japanese application JP 2017-150790 filed on Aug. 3, 2017, the content of which is hereby incorporated by reference into this application.

BACKGROUND OF THE INVENTION

The present invention relates to multidimensional data management systems and multidimensional data management methods.

In recent years, various approaches for achieving effective developments in material engineering have been made, and increasing attention has been paid to material informatics. Simulation technologies such as first-principles calculation have been introduced into the field of material engineering so far. Along with high attention paid to big data and artificial intelligence technologies in recent years, researchers have been utilizing data of experiment results and simulation results obtained at their research fields in order to verify their hypotheses. Therefore needs for analyzing these vast data have been increasingly growing.

Generally speaking, data of experiment results and simulation results obtained at research fields are multidimensional data including one or more physical quantities associated with one or more dimensions. Researchers extract multidimensional data within one or more dimensions and within the ranges of the values of those dimensions, and visualize the physical quantities of the extracted multidimensional data in order to verify their hypotheses. Processing of extracting multidimensional data within one or more dimensions and within the ranges of the values of those dimensions is range searching.

In addition, researchers accumulate the results of experiments carried out in the past and refer to the results of experiments obtained in the past the characteristics of which are similar to those of the newly obtained results of experiments, or the researchers carry out simulations in advance, accumulate the results of the simulations, and refer to the results of simulations the characteristics of which are similar to the characteristic of newly obtained experiment data in order to verify their hypotheses. Processing of extracting similar multidimensional data in this way is similarity searching.

In order for researchers to speedily repeat the cycles of hypothesis verification, it is very important to analyze experiment results and simulation results in short times. Since experiment results and simulation results include a large number of records and they are multidimensional data, a technology using which range searching and similarity searching are speedily carried out becomes indispensable.

Japanese Patent Application Publication (Translation of PCT Application) No. 2007-521565 discloses a technology in which "each dimension in a characteristic space is divided into several partitions", "a single partition is selected by each dimension", "a reduced data object set that includes only data objects overlapping a selected partition is selected", and "a match corresponding to a query is determined" using "this reduced data object set" (refer to Abstract).

SUMMARY OF THE INVENTION

If the technology disclosed in Japanese Patent Application Publication No. 2007-521565 is used, it becomes possible to limit a target of "matching" (searching) to "selected partitions". Nevertheless, although, in order to speedily limit "partitions" (ranges) that are targets of searching, it is necessary to speedily select the "partitions" (ranges) from a search condition included in a "query", it cannot be said that a technology regarding information that should be provided for this purpose is sufficiently described in Japanese Patent Application Publication No. 2007-521565.

One of the objects of the present invention is to provide information for speeding up the search of multidimensional data.

A typical multidimensional data management system according to the present invention is a multidimensional data management system for registering and searching multidimensional data, and this multidimensional data management system is characterized in that this system includes: a central processing unit; a storage device that stores multidimensional data including the respective values of a plurality of dimensions, and multidimensional management data associating the ranges of the respective values of a plurality of dimensions with character strings; and a memory for storing programs. The central processing unit for executing programs stored in the memory obtains the respective values of a plurality of dimensions included in each multidimensional data from the storage device; obtains the ranges of the respective values of a plurality of dimensions defined in the multidimensional management data stored in the storage device within which the obtained respective values of the plurality of dimensions fall respectively; obtains character strings associated with the obtained ranges of the respective values of the plurality of dimensions in the multidimensional management data; couples the obtained character strings; and associates the coupled character strings with each multidimensional data, and stores each multidimensional data with the coupled character strings as an already-registered multidimensional data.

According to the present invention, information used for speeding up the search of multidimensional data can be provided.

DESCRIPTION OF THE EMBODIMENTS

Hereinafter, a preferable embodiment for implementing the present invention will be explained as a practical example with reference to the accompanying drawings.

Figure 1:
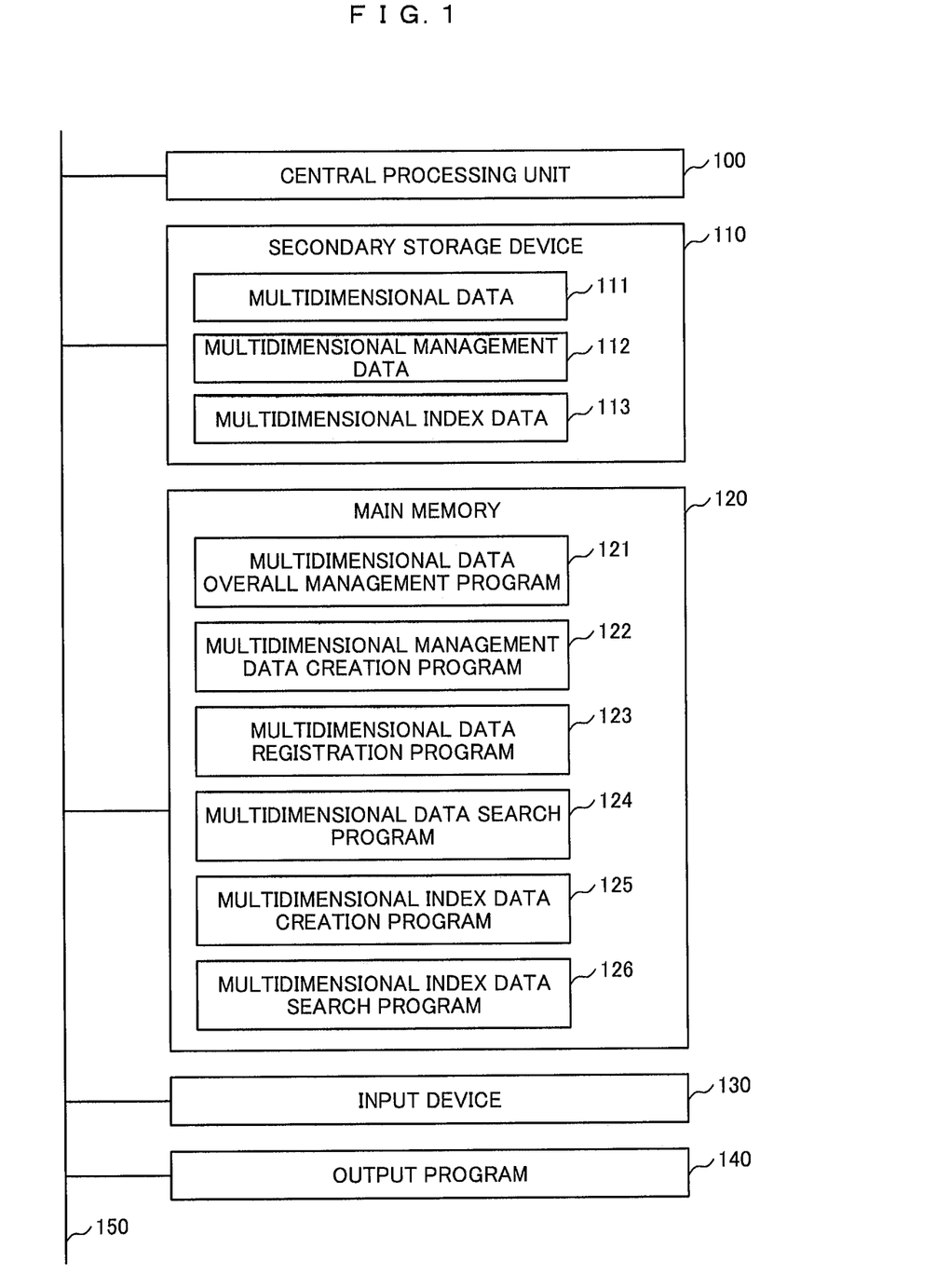
FIG. 1 is a block diagram showing an example of a configuration of a multidimensional data management system.

FIG. 1 is a block diagram showing an example of a configuration of a multidimensional data management system. As shown in FIG. 1, the multidimensional data management system is a computer in which there are a central processing unit 100; a secondary storage device 110; a main memory 120; an input device 130; and an output device 140, and these are connected via a bus 150.

The central processing unit 100 is a processor for executing programs stored in the main memory 120. The secondary storage device 110 is, for example, a high-capacity and nonvolatile storage device such as a magnetic storage device or a flash memory, and data used by the central processing unit 100 is stored in the secondary storage device 110 at the time of programs being executed.

To put it concretely, multidimensional data 111, multidimensional management data 112, and multidimensional index data 113 are stored in the secondary storage device 110.

As explained with reference to FIG. 4 and FIG. 9 later, the multidimensional data 111 includes plural multidimensional data including information regarding plural dimensions, that is, multiple dimensions and physical quantities, so that the multidimensional data 111 is, for example, a multidimensional table. In the multidimensional table, each multidimensional data is stored as a record, and it can be managed by its record number or its address.

The multidimensional data 111 can include a multidimensional data schemer. The multidimensional data schemer includes the column names and column data types of the multidimensional data table. As explained with reference to FIG. 3 later, the multidimensional management data 112 is data for managing the multidimensional data 111.

The multidimensional index data 113 is an index for searching for a multidimensional data (or the record number of the multidimensional data or the storage address of the multidimensional data) among multidimensional data 111 (multidimensional data table) using a multidimensional code as a key, and, for example, it is a B-tree index or a text index.

The multidimensional index data 113 is a commonly used index, so that, even if the multidimensional index data 113 may be any type of index, the explanation of this embodiment is not influenced. Therefore, the detailed explanations of the contents and the usage method of the multidimensional index data 113 will be omitted.

The main memory 120 is, for example, a high-speed and nonvolatile memory such as a DRAM (dynamic random access memory), an operating system (OS) and application programs are stored in the main memory 120. The operating system is executed by the central processing 100, which leads to the realization of the fundamental functions of the computer, and the application programs are executed, which leads to the realization of the functions specific to the applications.

To put it concretely, the main memory 120 includes Multidimensional Data Overall Management Program 121, Multidimensional Management Data Creation Program 122, Multidimensional Data Registration Program 123, Multidimensional Data Search Program 124; Multidimensional Index Data Creation Program 125, and Multidimensional Index Data Search Program 126.

Multidimensional Data Overall Management Program 121 is a program for managing multidimensional data 111 and the like. For example, it is conceivable that Multidimensional Data Overall Management Program 121 provides plural programs to be hereinafter described with the addresses of multidimensional data 111 so that each of the plural programs can access the multidimensional data 111 in common when it is executed. Furthermore, it is also conceivable that, when the programs to be hereinafter described access the multidimensional data 111, each of the programs can use Multidimensional Data Overall Management Program 121.

Multidimensional Data Overall Management Program 121 can also include programs for bringing in multidimensional data 111 and the like from the outside of the multidimensional data management system or programs for outputting the multidimensional data 111 and the like to the outside. In addition, it is conceivable that any of the programs to be hereinafter described is activated in accordance with an operation provided from the outside of the multidimensional data management system.

Multidimensional Management Data Creation Program 122 is a program for creating multidimensional management data 112 from input multidimensional management data. Multidimensional Data Registration Program 123 is a program for creating multidimensional data 111 from input multidimensional data.

Multidimensional Data Search Program 124 is a program for executing search processing (rough determination, detailed determination) with reference to the multidimensional data 111. The differences between this input data and this created data will be explained later.

Multidimensional Index Data Creation Program 125 is a program for generating index data from registration purpose multidimensional data and registering the index data in the multidimensional index data 113. Multidimensional Index Data Search Program 126 is a program for executing search processing (rough determination) with reference to the multidimensional index data 113.

Here, although an example in which the programs are stored in the main memory 120 is shown in FIG. 1, the programs can be stored in the secondary storage device 110. In this case, the programs are read out from the secondary storage device 110, and loaded into the main memory 120, so that the programs are executed by the central processing unit 100.

The input device 130 is a device that plays a role of a user interface such as a keyboard or a mouse. The output device 140 is a device that plays a role of a user interface such as a display device or a printer. Here, it is also conceivable that the multidimensional data management system includes a communication interface for connecting itself to a network and controlling the communication between itself and other apparatuses.

In the case where the multidimensional data management system includes a communication interface, it is connected to a terminal via the communication interface, and while the terminal plays a role in place of the input device 130 and the output device 140, the multidimensional data management system processes multidimensional data according to a request from the terminal, and outputs the processing result to the terminal.

Furthermore, it is also conceivable that the multidimensional data management system includes a read/write device that is a portable storage medium. Data stored in the secondary storage device 110 and programs stored in the main memory 120 can be stored in the portable storage medium and the data and the programs can be read by the multidimensional data management system, or it is also conceivable that equivalent data and programs are input into the multidimensional data management system via the communication interface.

The data stored in the secondary storage device 110 can be written in the portable storage medium or it can be output into another device via the communication interface. In addition, the multidimensional data management system can be built physically on one computer, or can be built on one logical portion physically constituted on one or plural computers.

Figure 2:
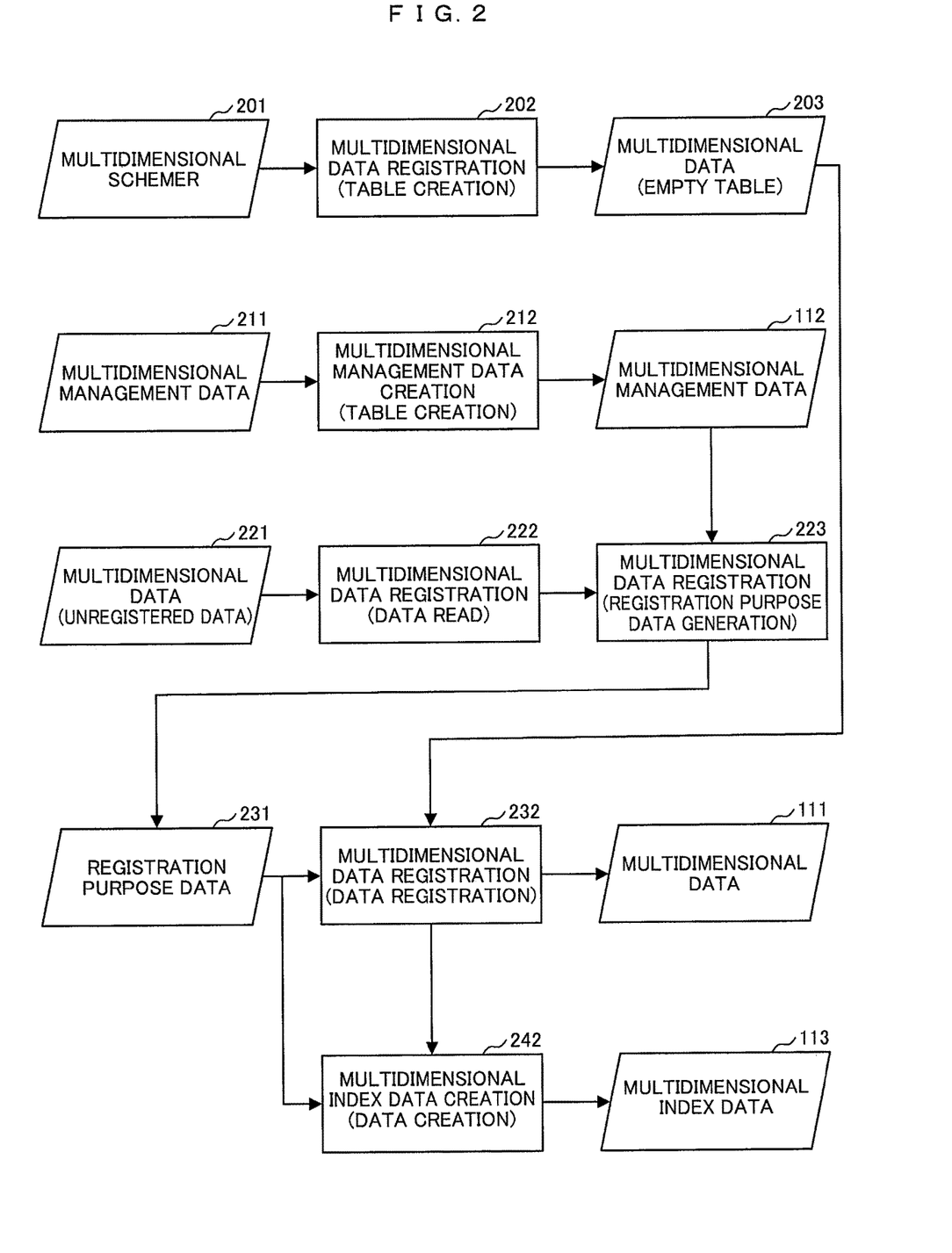
FIG. 2 is a diagram showing an example of register processing of multidimensional data.

FIG. 2 is a diagram showing an example of register processing of multidimensional data. The central processing unit 100, which executes Multidimensional Data Registration Program 123, operates as Multidimensional Data Registration 202, and before multidimensional data is registered, Multidimensional Data Registration 202 creates multidimensional data 203, which becomes an empty multidimensional data table, according to a multidimensional schemer 201 that defines the configuration of a table in which the multidimensional data is registered.

The multidimensional schemer includes information necessary to create the frame of the multidimensional data table such as a table name, column names, data types of the columns, an index definition. As described above, the multidimensional schemer 201 can be included in the input multidimensional data 111. The multidimensional data 203, which is an empty multidimensional data table, can have a data structure that is managed by a RDB (relational database).

The central processing unit 100, which executes Multidimensional Management Data Creation Program 122, operates as Multidimensional Management Data Creation 212, and before the multidimensional data is registered, Multidimensional Management Data Creation 212 creates the table of the multidimensional management data 112 according to input multidimensional management data 211.

The multidimensional management data 112 is data the partitioned regions of a multidimensional space for which are defined in order to speed up the search of the multidimensional data 111. In the multidimensional management data 112, the ranges of the values of the respective dimensions and the codes of character strings assigned to the ranges are defined. The ranges of the values of the respective dimensions can be set constant in advance respectively, or the ranges can be set inconstant by partitioning the values more finely depending on the numbers of multidimensional data belonging to the respective ranges. It is preferable that two or more values should be included within each range.

The multidimensional management data 211 can be any data as long as it is data that can be used for creating the multidimensional management data 112. For example, the multidimensional management data 211 is information about the distribution of multidimensional data, and it is conceivable that Multidimensional Management Data Creation 212 respectively defines partition regions so that the same numbers of multidimensional data are included (distributed) within the ranges of the partition regions respectively to create the multidimensional management data 112.

Furthermore, it is conceivable that the multidimensional management data 211 is information about the distribution of multidimensional data and Multidimensional Management Data Creation 212 respectively defines constant partition regions so that the numbers of multidimensional data respectively included within the ranges of the constant partition regions are maximally averaged to create the multidimensional management data 112. In addition, it is also conceivable that the multidimensional management data 211 is multidimensional data 221 that has not been registered yet, and Multidimensional Management Data Creation 212 can measure the distribution of the multidimensional data as preprocessing.

Alternatively, it is also conceivable that the multidimensional management data 211 includes the same information as the multidimensional management data 112 includes, and Multidimensional Management Data Creation 212 converts the data format of the above information.

Figure 3:
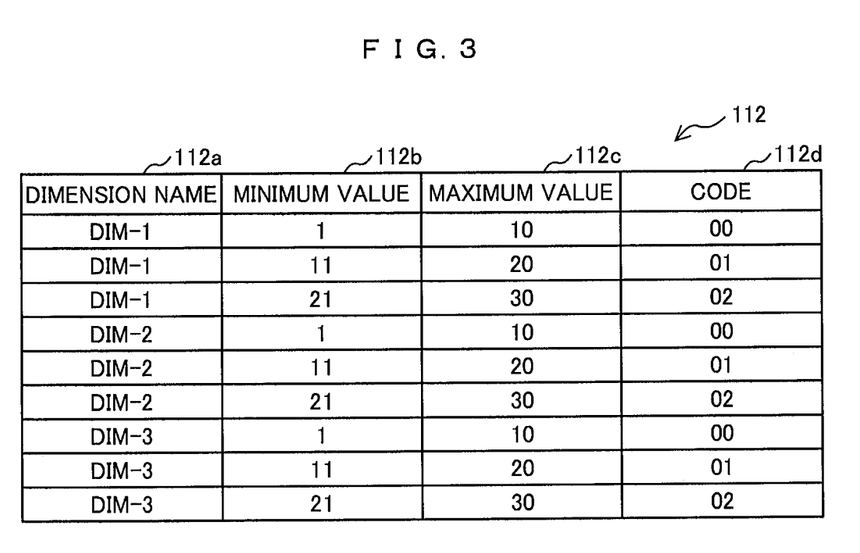
FIG. 3 is a diagram showing an example of multidimensional management data.

FIG. 3 is a diagram showing an example of the multidimensional management data 112. In the example shown in FIG. 3, it will be assumed that there exist three dimensions (DIM-1, DIM-2, and DIM-3), and the range of each dimension and the code of a character string assigned to the range are defined. Dimension Name 112a is a name used for distinguishing dimensions, and dimensions in this example are "DIM-1", "DIM-2", and "DIM-3".

In this example, each dimension has one value which falls into a range, and Minimum Value 112b and Maximum Value 112c represent respectively a minimum value and a maximum value that show the range to which a code of Code 112d is assigned in a dimension distinguished by Dimension Name 112a.

Furthermore, although Code 112d in this example is a character code composed of two numeric characters, Code 112d is not limited to a character code composed of two numeric characters. Code 112d can be another type of code as long as it can show that two values existing in one dimension are near to each other as is the case with "00" and "01" of Code 112d that show two corresponding ranges being near to each other.

In addition, in this example, each dimension has the same ranges as a simple case. For example, Character String Code "00" is assigned to the value of DIM-1 included in the range having the minimum value 112b"1" and the maximum value 112c"10" in Dimension Name 112a"DIM-1".

Returning to the topic back to the explanation about FIG. 2, in the state where the multidimensional data 203 and the multidimensional management data 112 have been created, the multidimensional data having practical values is registered. A multidimensional data that has not been registered yet is a data record composed of the values of two or more dimensions and one or more physical quantities that are associated with a combination of the values of those dimensions. The multidimensional data 221 that includes plural multidimensional data that have not been registered yet can be data (or a data file) in a CSV (comma separated values) format in which values are represented in such a way that the values are separated by commas from each other.

Figure 4:
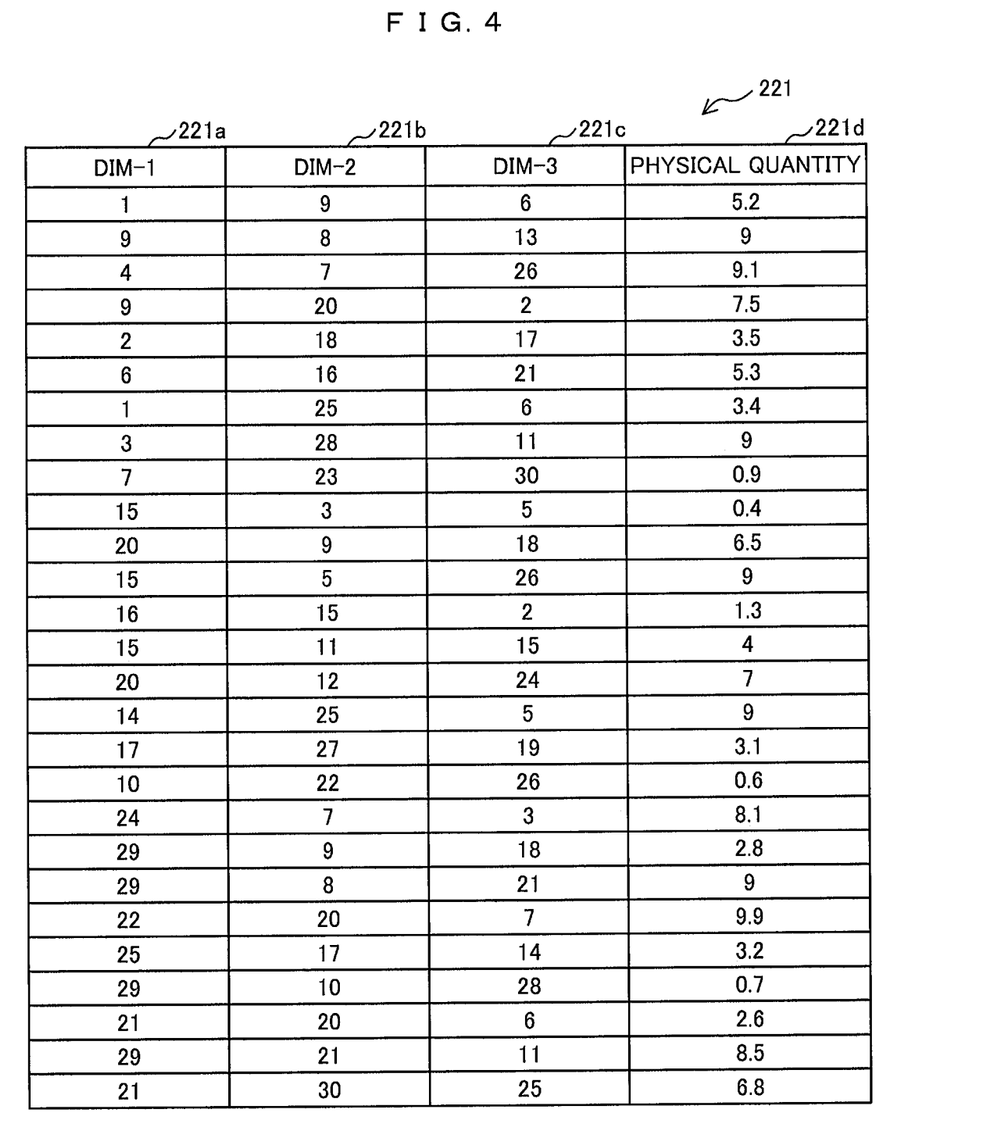
FIG. 4 is a diagram showing an example of multidimensional data that has not been registered yet.

FIG. 4 shows an example of multidimensional data 221 that has not been registered yet. The example in FIG. 4 shows the multidimensional data 221 including plural multidimensional data each of which is composed of the values of three dimensions and one physical quantity associated with the values of these dimensions. Here, the multidimensional data 221 represented in a CSV format in which the plural multidimensional data are represented by "1, 9, 6, 5.2, . . . " is displayed as a table in order to be easily understood.

DIM-1 221a is the value of a dimension distinguished by Dimension Name "DIM-1", DIM-2 221b is the value of a dimension distinguished by Dimension Name "DIM-2", and DIM-3 221c is the value of a dimension distinguished by Dimension Name "DIM-3".

The values of DIM-1 221a to DIM-3 221c are corresponding to Minimum Values 112b to Maximum Values 112c of the multidimensional management data 112 shown in FIG. 3, and they are values that can be compared with each other in terms of their magnitudes. Furthermore, the values of Physical Quantity 221d are real numbers that can be targets for four fundamental rules of arithmetic.

Returning to the topic back to the explanation about FIG. 2, the central processing unit 100, which executes Multidimensional Data Registration Program 123, operates as Multidimensional Data Registration 222, and Multidimensional Data Registration 222 reads the multidimensional data 221. Next, the central processing unit 100, which executes Multidimensional Data Registration Program 123, operates as Multidimensional Data Registration 223, and Multidimensional Data Registration 223 generates registration purpose data 231 according to the multidimensional management data 112.

Figure 5:
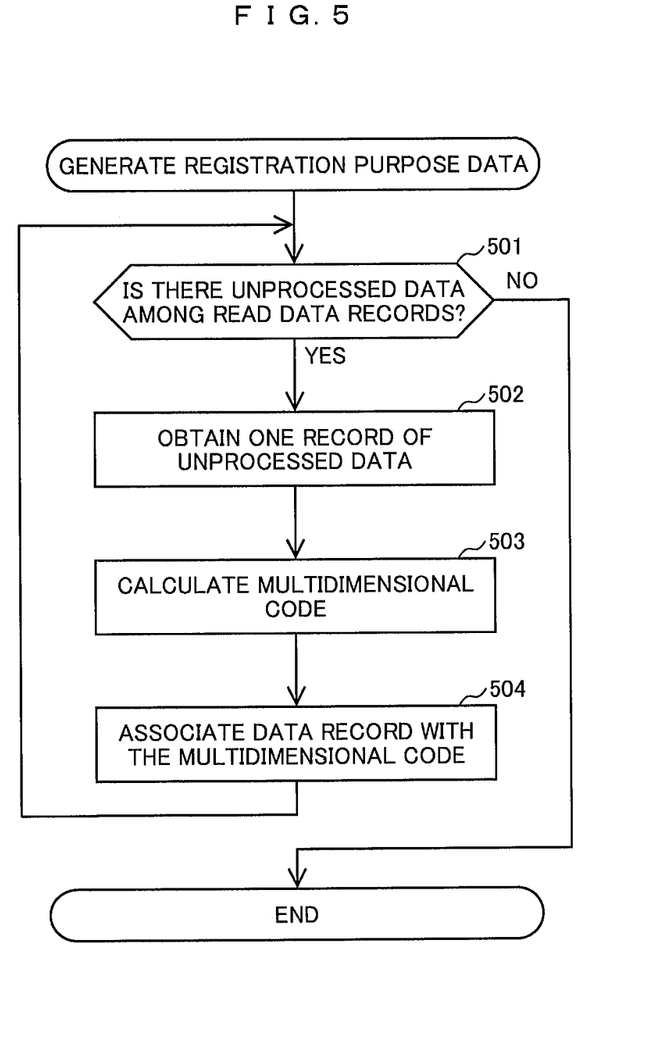
FIG. 5 is a flowchart showing an example of the generation of registration purpose data.

FIG. 5 shows an example of the generation of registration purpose data for Multidimensional Data Registration 223. Since Multidimensional Data Registration 223 is processing performed by the central processing unit 100 which executes Multidimensional Data Registration Program 123, a flowchart shown in FIG. 5 is a flowchart executed by the central processing unit 100. The registration purpose data 231 that is generated by Multidimensional Data Registration 223 is data equal to the multidimensional data 221 to which the relevant multidimensional codes are added.

Therefore, in the generation of the registration purpose data, a range of the value of each dimension defined in the multidimensional management data 112 in which the value of each dimension of a multidimensional data in the multidimensional data 221 is included is specified, and a multidimensional code is generated from a code corresponding to the specified range.

First, Multidimensional data Registration 223 determines whether there is a multidimensional data that has not been processed yet among the multidimensional data read by Multidimensional Data Registration 222 (at Step 501). Alternatively, this above determination can be made by determining whether the last multidimensional data just before the EOF (end of file) of the file of the multidimensional data 221 that has not been registered yet has been processed.

If Multidimensional Data Registration 223 determines that there is no unprocessed multidimensional data at Step 501, it ends this registration processing, and if Multidimensional Data Registration 223 determines that there is one or more unprocessed multidimensional data, it obtains one unprocessed multidimensional data (at Step 502), and calculates the multidimensional code of the obtained multidimensional data (at Step 503).

For example, in the case where the value of DIM-1 of the multidimensional data is "1", among three rows having Dimension Name "DIM-1", the uppermost row having Minimum Value 112b and Maximum Value 112c within which "1" is included has Code "00", and in the case where the value of DIM-2 of the multidimensional data is "9", among three rows having Dimension Name "DIM-2", the uppermost row having Minimum Value 112b and Maximum Value 112c within which "9" is included has Code "00".

In addition, in the case where the value of DIM-3 of the multidimensional data is "6", among three rows having Dimension Name "DIM-3", the uppermost row having Minimum Value 112b and Maximum Value 112c within which "6" is included has Code "00". As a result, three character codes "00", "00", and "00" are obtained, these codes are coupled, and one character string code is generated. This character string code is referred to as a multidimensional code.

A format used for coupling these codes is defined in advance, and in the case where a colon is used as a separator for example, the above three codes are coupled to become "00:00:00". Here, one multidimensional code that is denoted by "00:00:00" or the like should be information that can be contained in the read/write unit of the secondary storage device 110 or in the read/write unit of the main memory 120.

Multidimensional Data Registration 223 associates a multidimensional data that is the generation source of the multidimensional code with the generated multidimensional code, and makes the multidimensional data associated with the multidimensional code a part of the registration purpose data 231 (at Step 504), and the flow goes back to Step 501.

The association of one multidimensional code with one multidimensional data can be made by adding the multidimensional code represented in a CSV format to the multidimensional data represented in the CSV format. The registration purpose data 231 can be data to which multidimensional data that are respectively associated with the relevant multidimensional codes by executing the loop from Step 501 to Step 504 and that is represented in the CSV format are sequentially added in the CSV format.

Returning to the topic back to the explanation about FIG. 2, the central processing unit 100, which executes Multidimensional Data Registration Program 123, operates as Multidimensional Data Registration 232, and Multidimensional Data Registration 232 registers the registration purpose data 231 in the multidimensional data 203 that is an empty multidimensional data table. The multidimensional data 203 is composed of a column for multidimensional codes, columns for the values of two or more dimensions, and columns for one or more physical quantities.

Here, the column for the multidimensional codes can be a character string-type column, and it can be a fixed-length character string-type column or a variable-length string-type column.

Figure 6:
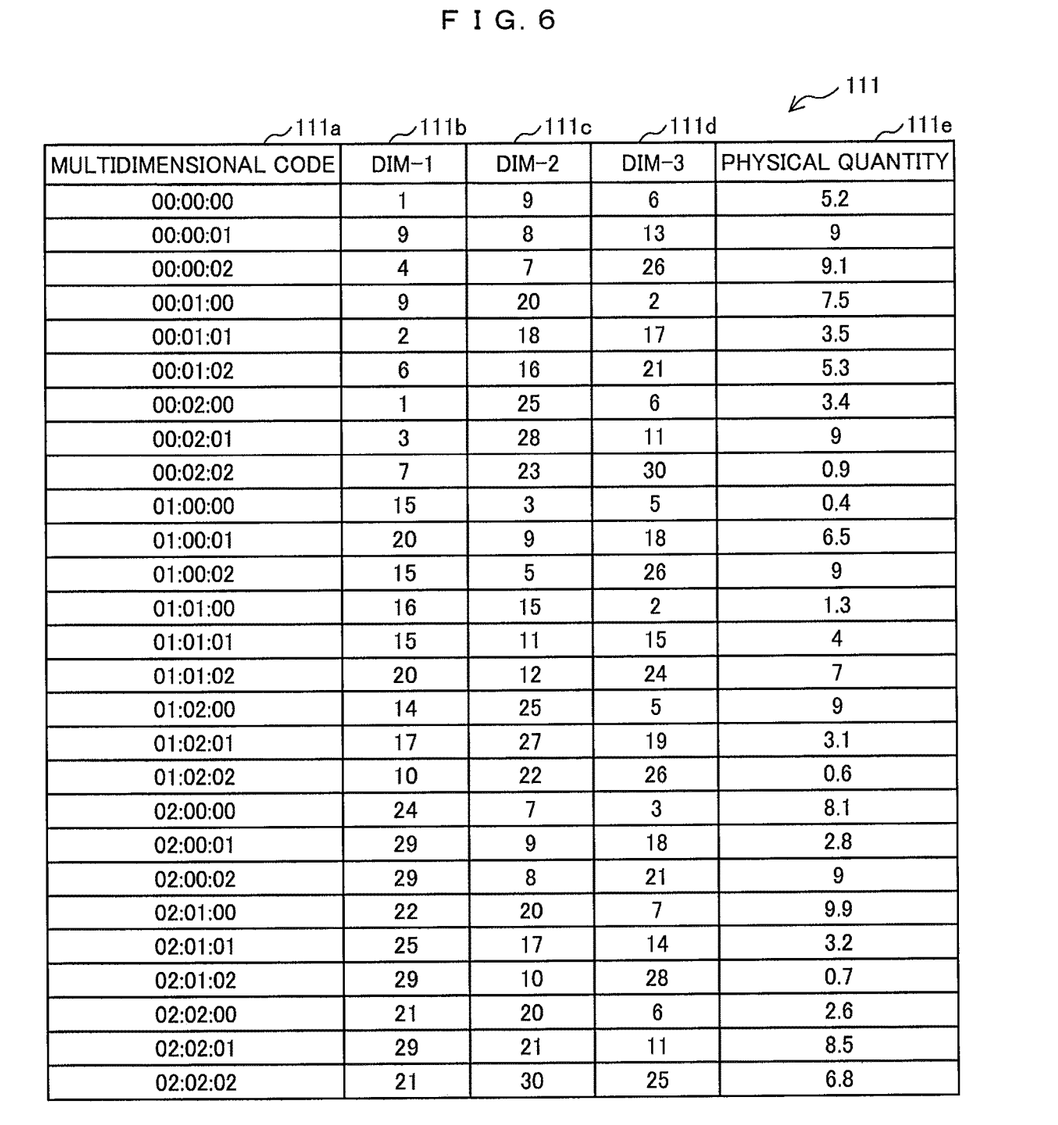
FIG. 6 is a diagram showing an example of already-registered multidimensional data.

FIG. 6 shows an example of the multidimensional data 111 that has been registered. DIM-1 111b, DIM-2 111c, DIM-3 111d and Physical Quantity 111e are corresponding to DIM-1 221a, DIM-2 221b, DIM-3 221c and Physical Quantity 221d shown in FIG. 4 respectively, and Multidimensional Code 111a is corresponding to the multidimensional code calculated at Step 503.

Therefore, as described above, if the value of DIM-1 111b is "1", the value of DIM-2 111c is "9", and the value of DIM-3 111d is "6", the codes of these dimensions are "00", "00", and "00" respectively. Since the values of DIM-1, DIM-2, and DIM-3 are coupled in this order in the coupling format with colons as separators, this Multidimensional Code 111a becomes "00:00:00".

The reason why the multidimensional data 221 that has not been registered yet and that is shown in FIG. 4, and the multidimensional data 111 that has been registered and that is shown in FIG. 6 are represented in a similar way in table formats is for the purpose of these data pieces being easily understood, and it is also conceivable that the multidimensional data 221 is stored in the secondary storage device 110 in a CSV format and the multidimensional data 111 is stored in the secondary storage device 110 in a RDB format.

Returning to the topic back to the explanation about FIG. 2, the central processing unit 100, which executes Multidimensional Index Data Creation Program 125, operates as Multidimensional Index Data Creation 242, and Multidimensional Index Data Creation 242 receives the registration purpose data 231, extracts a multidimensional code from the registration purpose data 231, receives the record number or storage address of a multidimensional data corresponding to the extracted multidimensional code from Multidimensional Data Registration 232, and generates multidimensional index data 113.

The multidimensional index data 113 is an index for searching the multidimensional data (the record numbers or the record storage addresses of multidimensional data) using multidimensional codes as keys, and for example, they can be a B-tree index or a test index. Therefore, Multidimensional Index Data Creation 242 can also generate the multidimensional index data 113 from the multidimensional data 111.

Figure 7:
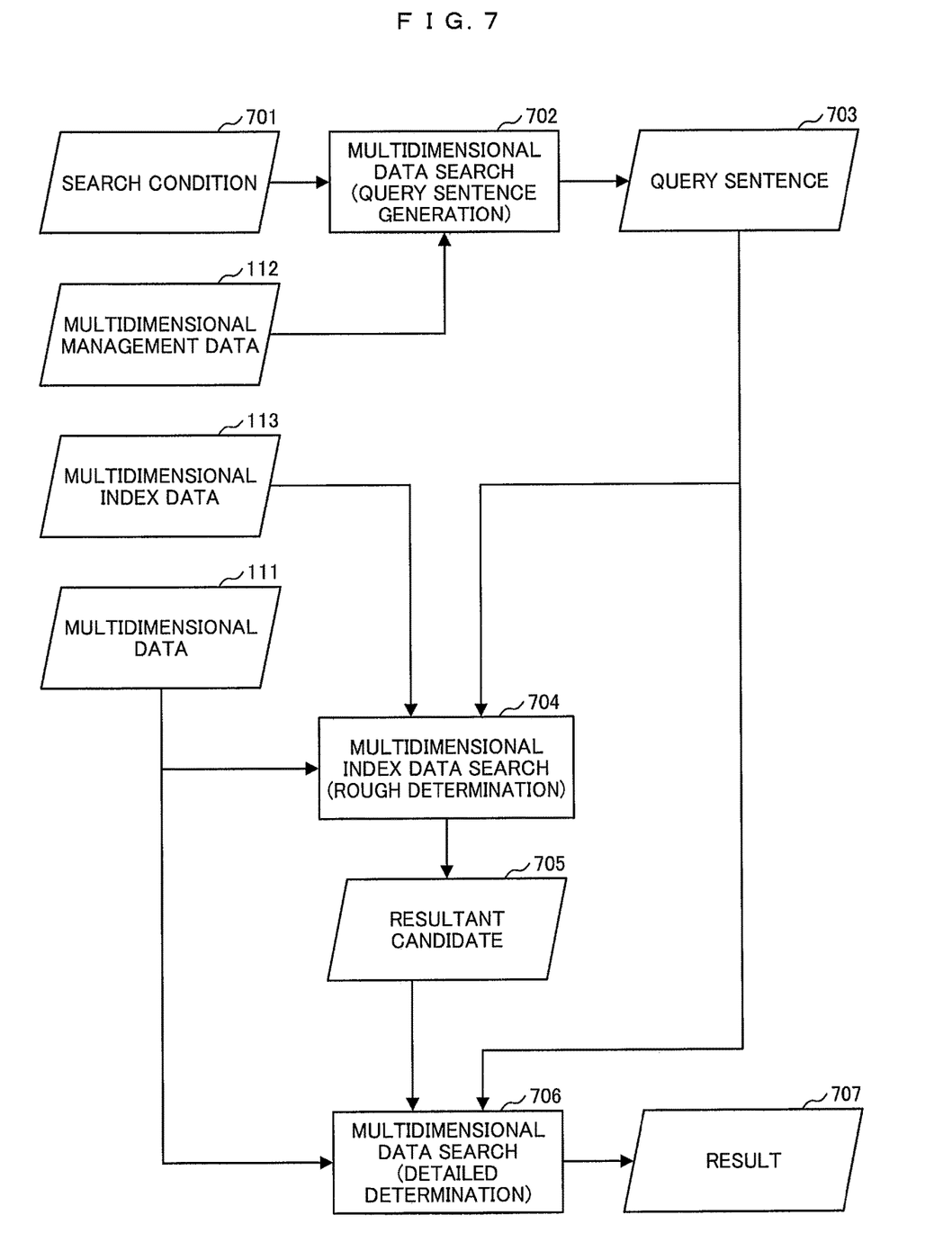
FIG. 7 is a diagram showing an example of search processing of multidimensional data.

Next, the search processing of multidimensional data will be explained. FIG. 7 is a diagram showing an example of the search processing of multidimensional data. The central processing unit 100, which executes Multidimensional Data Search Program 124, operates as Multidimensional Data Search 702, and Multidimensional Data Search 702 generates a query sentence 703 using a search condition 701 and multidimensional management data 112.

The search condition 701 is a search condition of range searching or similarity searching, and it includes one or more dimensions and the ranges of the values of one or more dimensions. Multidimensional Data Search 702 adds a search condition using a multidimensional code, into which the dimensions and the ranges of the values, which are included in this search condition 701, are converted, to this search condition 701, and generates a query sentence 703 after converting the format of the this search condition 701.

Here, a search condition using multidimensional codes is a condition that the character strings of the multidimensional codes or parts thereof accord with each other and the like, for example, and the search condition can be expressed with the use of a regular expression in which a condition that a character of the relevant multidimensional code accords with an arbitrary character is included. Furthermore, the query sentence 703 can be a query sentence written in the SQL language.

The central processing unit 100, which executes Multidimensional Index Data Search Program 126, operates as Multidimensional Index Data Search 704, and Multidimensional Index Data Search 704 executes the query sentence 703 (executes searching using the query sentence 703), and further extracts resultant candidates 705 that satisfies the search condition from the multidimensional data 111.

This searching is a rough determination, and Multidimensional Index Data Search 704 obtains the record numbers or the storage addresses of records that satisfy the search condition including a multidimensional code included in the query sentence 703 with reference to the multidimensional index data 113, and squeezes out multidimensional data having the possibility of satisfying the search condition 701.

In the rough determination, the record numbers or storage addresses of the obtained records can be made resultant candidates 705, or it is conceivable that pieces of information included in records are extracted from the multidimensional data 111 on the basis of these record numbers or storage addresses and these pieces of information are made resultant candidates 705.

The central processing unit 100, which executes Multidimensional Data Search Program 124, operates as Multidimensional Data Search 706, and Multidimensional Data Search 706 executes the query sentence 703, and further extracts final results 707 that satisfy the search condition from the multidimensional data 111.

This searching is a detailed determination, and Multidimensional Data Search 706 extracts records that satisfy a condition regarding one or more dimensions and the ranges of these dimensions from among the resultant candidates 705, in which the condition is included in the search condition 701 of the query sentence 703, and makes the extracted records results 707. In the case where a resultant candidate 705 includes multidimensional data itself, it is not necessary for Multidimensional Data Search 706 to refer to the multidimensional data 111.

Figure 8:
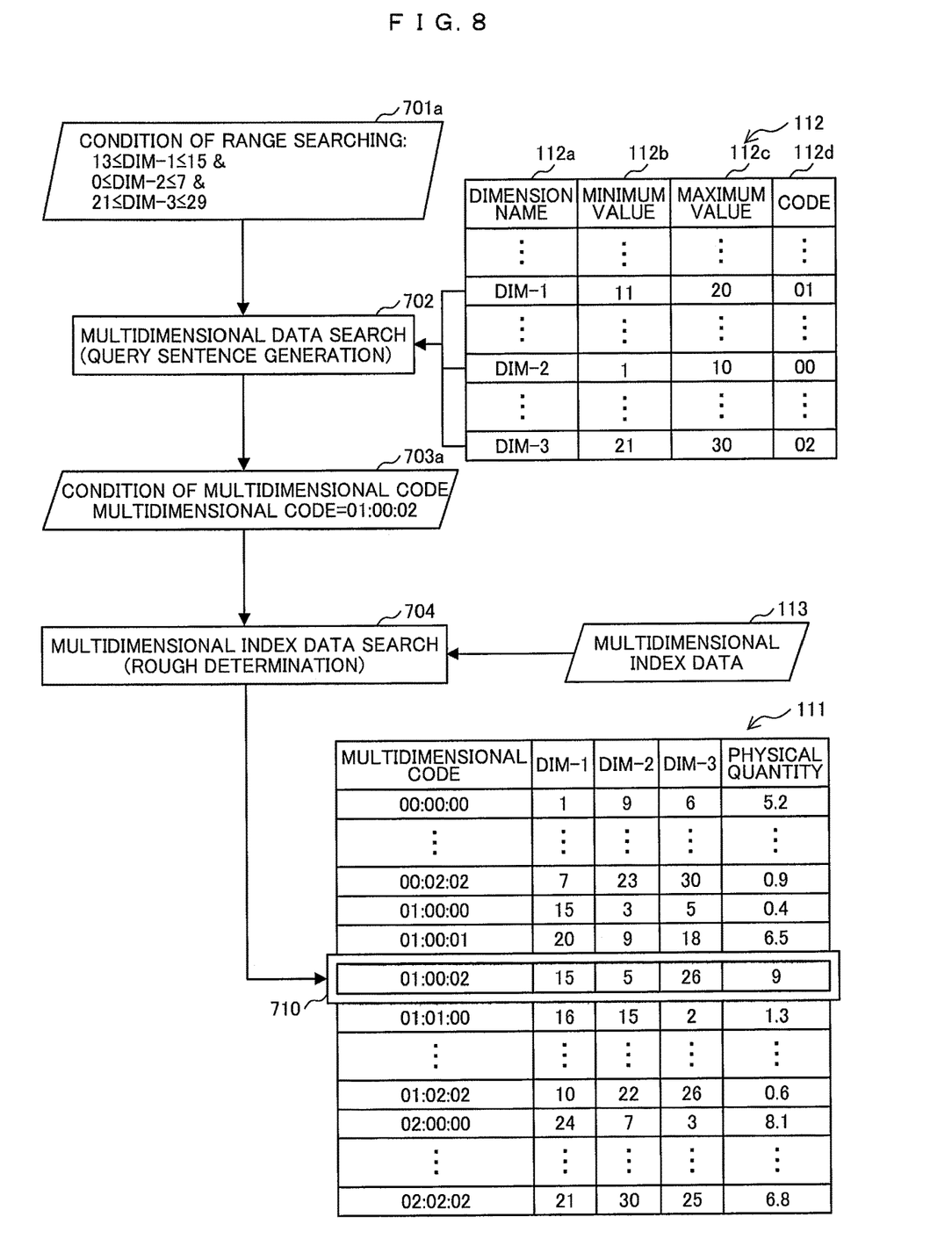
FIG. 8 is a diagram showing an example of range processing of multidimensional data.

FIG. 8 is a diagram showing an example of range processing of multidimensional data. In this case, the search condition 701 is a condition of range searching, and it is an example of a search condition 701a "13<=DIM-1<=15, 0<=DIM-2<=7, and 21<=DIM-3<=29". First, Multidimensional Data Search 702 obtains "Multidimensional Code=01:00:02" as "a condition of Multidimensional Code" from the condition of this range searching, adds this code to the condition of this range searching, and generates a query sentence 703a.

This Multidimensional Code is obtained, for example, by specifying "01" of Code 112d of a row of the multidimensional management data 112 having Dimension Name 112a"DIM-1", Minimum Value 112b "11" and Maximum Value 112c"20", in which "13" and "15" of "13<=DIM-1<=15" are included between Minimum Value 112b "11" and Maximum Value 112c "20", and by specifying other two Codes in a similar way, and further by coupling these three Codes.

Next, Multidimensional Index Data Search 704 searches for the record number or storage address of a record whose Multidimensional Code is 01:00:02 among the multidimensional index data 113, and makes the obtained record a resultant candidate. In this example, one resultant candidate is obtained, and the record number of Record 710 of the multidimensional data 111 becomes the storage address of the resultant candidate.

Subsequently, since only one record is extracted as a resultant candidate in FIG. 8, Multidimensional Data Search 706 (not shown) extracts the record 710 (DIM-1, DIM-2, DIM-3, Physical Quantity)=(15, 5, 26, 9), which is corresponding to the resultant candidate, among the multidimensional data 111.

Multidimensional Data Search 706 determines whether the values of the respective dimensions of the resultant candidate or the record 710 satisfy the condition of the range searching of the search condition 701a, and extracts the record 710 as a final result. Furthermore, it is also conceivable that a condition of Physical Quantity is added to the search condition 701, and whether the condition of Physical Quantity is satisfied is determined by the detailed determination.

An example of similarity searching of multidimensional data will be explained with reference to FIG. 9 and FIG. 10. FIG. 9 is a diagram showing an example of a search condition conversion used for similarity searching, and FIG. 10 is a diagram showing examples of tables of multidimensional data 111 used for the similarity searching.

Figure 9:
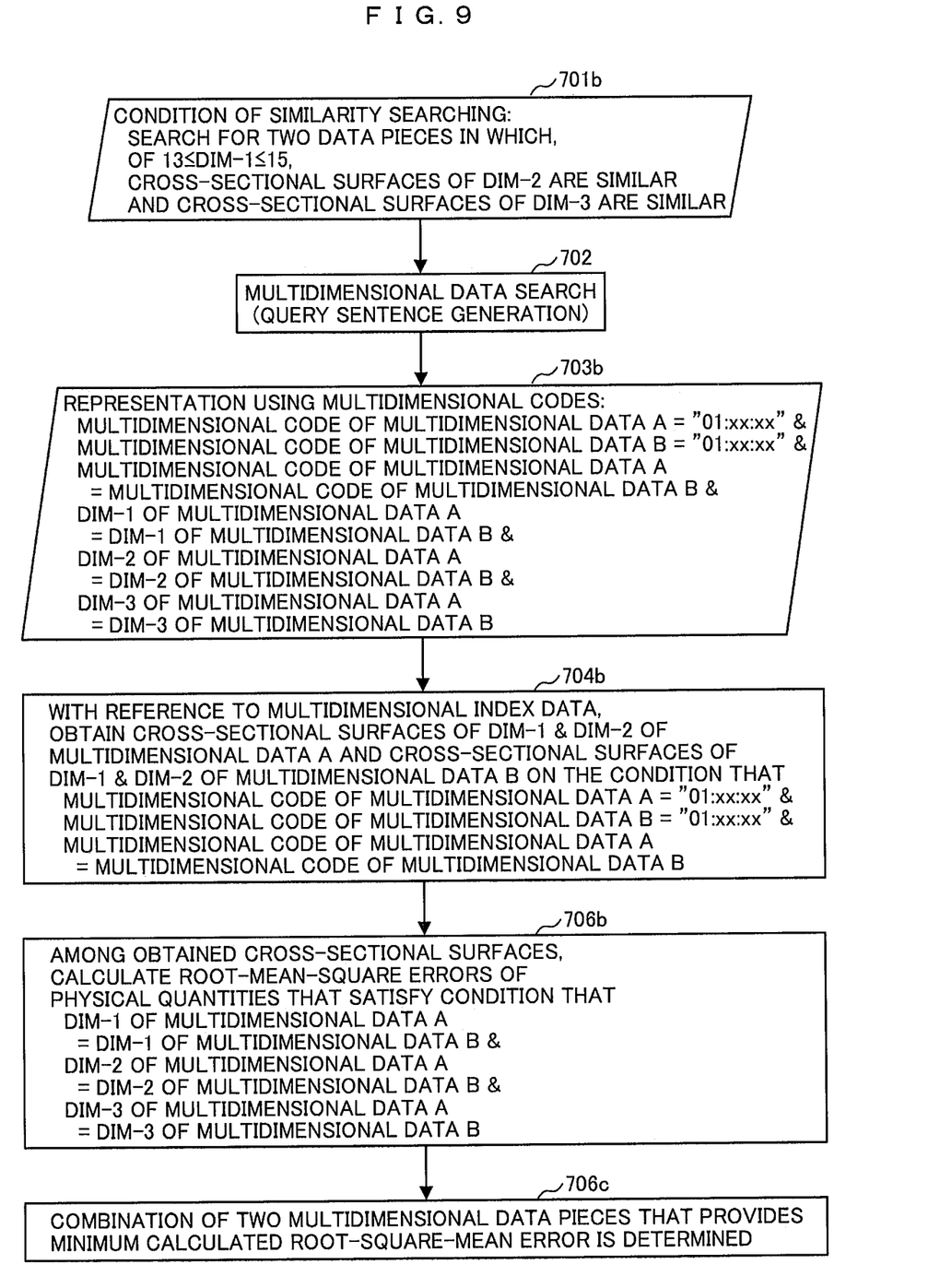
FIG. 9 is a diagram showing an example of a condition conversion of similarity searching.
Figure 10:
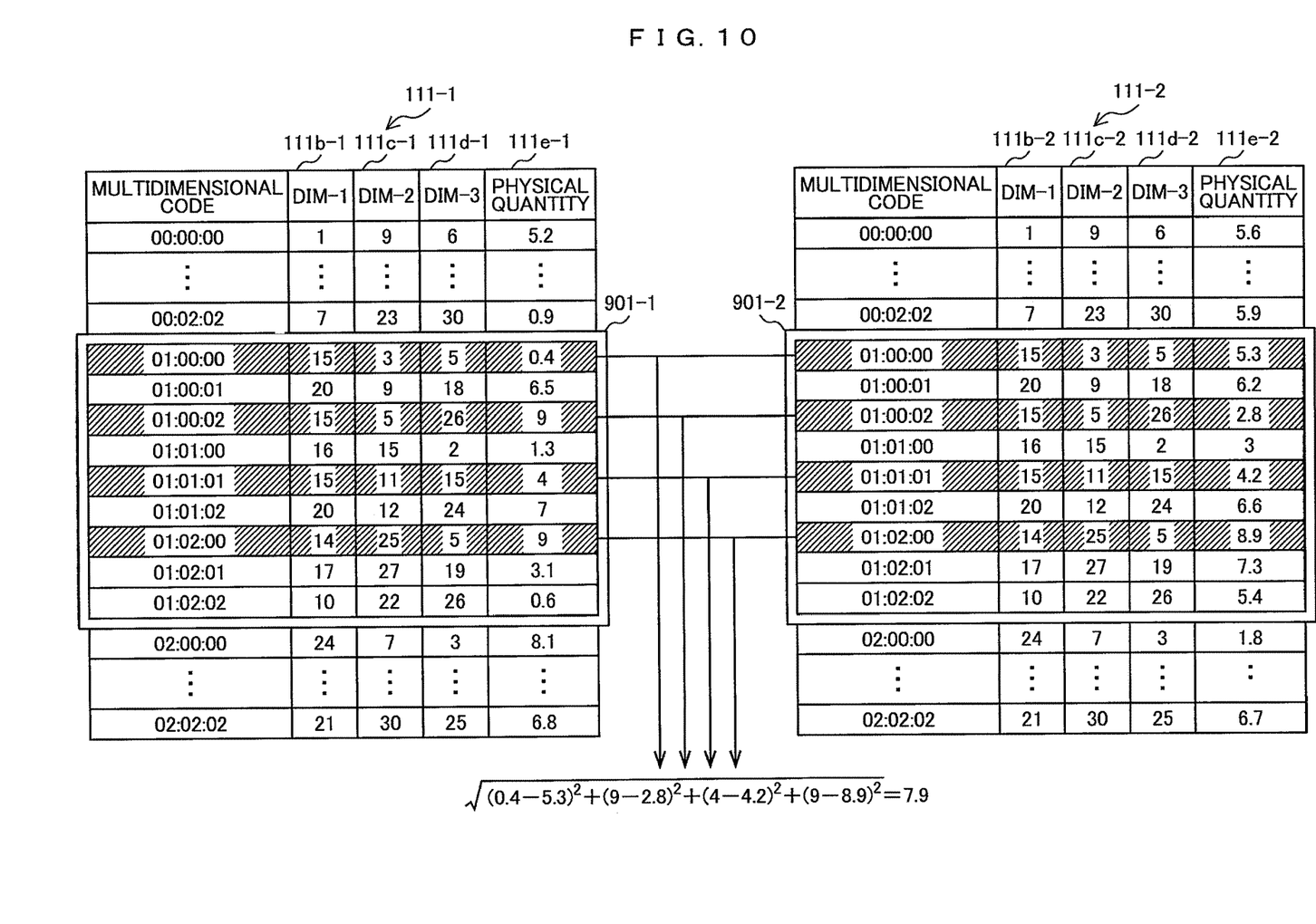
FIG. 10 is a diagram showing examples of tables of multidimensional data used for similarity searching.

As shown in FIG. 9, a condition of similarity searching in this example is a condition that DIM-1 of each of two data pieces satisfies 13<=DIM-1<=15 and the cross-sectional surfaces of DIM-2s of the two data pieces are similar to each other and the cross-sectional surfaces of DIM-3s of the two data pieces are similar to each other. First, Multidimensional Data Search 702 converts this similarity searching condition into a representation using Multidimensional Codes, adds this representation using Multidimensional Codes to the similarity searching condition, and generates a query sentence 703b.

In this example, "the representation using Multidimensional Codes" to be added is "Multidimensional Code of multidimensional data A="01:xx:xx", and Multidimensional Code of multidimensional data B="01:xx:xx", and Multidimensional Code of the multidimensional data A=Multidimensional Code of the multidimensional data B, and DIM-1 of the multidimensional data A=DIM-1 of the multidimensional data B, and DIM-2 of the multidimensional data A=DIM-2 of the multidimensional data B, and DIM-3 of the multidimensional data A=DIM-3 of the multidimensional data B".

Here, "x" depicts one arbitrary character, and although "x" is used instead of a dot "." because a dot "." is hard to visually perceive, a dot which is used in a regular expression can be used. "01:xx:xx" represents an arbitrary Multidimensional Code with its top two characters "01".

Multidimensional Data Search 702 obtains "01" of Code 112d of a row of the multidimensional management data 112 having Dimension Name 112a "DIM-1", Minimum Value 112b "11" and Maximum Value 112c "20", in which "13" and "15" of Search Condition 701b "13<=DIM-1<=15" are included between Minimum Value 112b "11" and Maximum Value 112c "20" with reference to the multidimensional management data 112.

Next, Multidimensional Index Data Search 704b obtains the cross-sectional surfaces of DIM-2 and DIM-3 of the multidimensional data A and the cross-sectional surfaces of DIM-2 and DIM-3 of the multidimensional data B with reference to the multidimensional index data 113 from the query sentence 703b. A range 901-1 of the multidimensional data A 111-1 and a range 901-2 of the multidimensional data B 111-2 shown in FIG. 10 are the obtained cross-sectional surfaces, and multidimensional data included in these ranges are resultant candidates 705.

Subsequently, Multidimensional Data Search 706b specifies two multidimensional data pieces the values of DIM-1s, DIM-2s, and DIM-3s of which accord with each other and each of DIM-1s of which satisfies the condition "13<=DIM-1<=15". Multidimensional data specified as above is hatched records shown in the range 901-1 and the range 901-2 shown in FIG. 10, and the degree of similarity is calculated using these records.

Although there are various indexes for the calculation of the degree of similarity and the criterion of determination, in this example, explanation will be given of a typical method for the calculation of similarity that uses a root-mean-square error, and it is determined that a combination of multidimensional data that shows the minimum value of a root-mean-square error provides the most similar multidimensional data.

As shown in FIG. 10, plural pairs of records among the hatched records are found in such a way that one record and the other record of each pair have to satisfy a condition that the value of DIM-1 111b-1 of the one record and the value of DIM-1 111b-2 of the other record are equal to each other, the value of DIM-2 111c-1 of the one record and the value of DIM-2 111c-2 of the other record are equal to each other, and the value of DIM-3 111d-1 of the one record and the value of DIM-3 111d-2 of the other record are equal to each other. Then a root-mean-square error is calculated using Physical Quantity 111e-1 and Physical Quantity 111e-2 of the plural pairs of records, and "7.9" is obtained as a root-mean-square error.

If there is multidimensional data, for example, "multidimensional data C" other than "multidimensional data A" and "multidimensional data B", the query sentence 703b includes a condition for a combination of "multidimensional data A" and "multidimensional data C" and a condition for a combination of "multidimensional data B" and "multidimensional data C" in addition to the condition for a combination of "multidimensional data A" and "multidimensional data B" shown in FIG. 9.

In response to the query sentence 703b including this "multidimensional data C", Multidimensional Index Data Search 704b obtains the cross-sectional surface of "multidimensional data C", and then Multidimensional Data Search 706b calculates the degree of similarity between "multidimensional data A" and "multidimensional data C" and the degree of similarity between "multidimensional data B" and "multidimensional data C".

Multidimensional Data Search 706b determines a combination that provides the smallest degree of similarity among the calculated three degrees of similarities, and two multidimensional data pieces composing the combination that provides the smallest degree of similarity are obtained. In the case where there is multidimensional data other than "multidimensional data C", the degrees of similarities involved with the former multidimensional data are calculated in the above-described way, and a combination of multidimensional data that provides the smallest degree of similarity is determined.

As described above, as information for speeding-up the search of multidimensional data, multidimensional codes can be generated and provided for searching. The multidimensional codes can be contained in the read/write unit of the secondary storage device or the main memory, therefore the multidimensional codes including information regarding plural dimensions can be read out at one access operation.

In addition, by making ranges represented by character strings assigned to one dimension of multidimensional codes constant, it becomes easy to assign character strings to the dimensions of the multidimensional codes, and by making ranges represented by character strings assigned to one dimension of the multidimensional codes inconstant, it becomes possible to make the number of multidimensional data included in the ranges constant.

Furthermore, in the above searching, the searching region of a detailed determination can be narrowed down with the use of the result of the precedent rough determination using multidimensional codes, which greatly contributes to the speeding-up of searching. This narrowing-down operation can be applied not only to searching in which the value of each dimension is specified but also to range searching and similarity searching.

What is claimed is:

1. A multidimensional data management system for registering and searching multidimensional data, comprising:
   a central processing unit;
   a storage device that stores multidimensional data including respective values of a plurality of dimensions wherein each value is a real number, and multidimensional management data storing a plurality of records, each record indicating one of the plurality of the dimensions stored in the multidimensional data and including a minimum value, which is a real number, a maximum value, which is a real number, and an associated character string; and
   a memory for storing programs,
   wherein the central processing unit, upon execution of one or more of the stored programs:

obtains the respective values of the plurality of dimensions included in the multidimensional data from the storage device;

for each value of each of the obtained respective values of the plurality of dimensions stored in the multidimensional data, identifies a record, among the plurality of records of the multidimensional management data, having the minimum value less than the value of the respective dimension and having the maximum value greater than the value of the respective dimension;

obtains, for each of the plurality of the dimensions, the character string associated with the identified record;

couples two or more of the obtained character strings for each of corresponding two or more of the plurality of dimensions; and associates the coupled character strings with multidimensional data, and stores multidimensional data with the coupled character strings as registered multidimensional data.

2. The multidimensional data management system according to claim 1, wherein the central processing unit that executes programs stored in the memory couples the obtained character strings using predefined characters as separators so that the coupled character strings can be contained in the readout units of the storage device.

3. The multidimensional data management system according to claim 2, wherein the storage device stores multidimensional management data in which the ranges of the respective values of a plurality of dimensions include the minimum values and the maximum values of the ranges respectively, and the differences between the minimum values and the maximum values of the plurality of ranges are constant.

4. The multidimensional data management system according to claim 2, wherein the storage device stores multidimensional data in which the ranges of the respective values of a plurality of dimensions include the minimum values and the maximum values of the ranges respectively, and the differences between the minimum values and the maximum values of the plurality of ranges are changed depending on the distributions of the multidimensional data.

5. The multidimensional data management system according to claim 2, wherein the storage device stores multidimensional management data in which the ranges of the respective values of a plurality of dimensions include the minimum values and the maximum values of the ranges respectively, and there are a plurality of multidimensional data distributed between the minimum values and the maximum values respectively.

6. The multidimensional data management system according to claim 2, wherein the central processing unit that executes programs stored in the memory generates multidimensional index data for searching for the storage location information of already-registered multidimensional data in the storage device from the coupled character strings, and stores the generated multidimensional index data in the storage device.

7. The multidimensional data management system according to claim 6, wherein the multidimensional index data is text index.

8. The multidimensional data management system according to claim 6, wherein the central processing unit that executes programs stored in the memory:

obtains the ranges of the values of a plurality of dimensions defined in the multidimensional management data stored in the storage device within which the values of dimensions included in a search condition fall respectively;

obtains character strings associated with the obtained ranges of the values of the plurality of dimensions in the multidimensional management data; and obtains the storage location information of already-registered multidimensional data by searching for the obtained character strings in the multidimensional index data stored in the storage device, and makes the obtained storage location information resultant candidates.

9. The multidimensional data management system according to claim 8, wherein the central processing unit that executes programs stored in the memory makes already-registered multidimensional data that meets the search condition a result among the resultant candidates.

10. The multidimensional data management system according to claim 8, wherein the central processing unit that executes programs stored in the memory:

obtains the ranges of the values of a plurality of dimensions defined in the multidimensional management data stored in the storage device within which the ranges of the values of dimensions included in a search condition fall respectively;

obtains character strings associated with the obtained ranges of the values of the plurality of dimensions in the multidimensional management data; and obtains the storage location information of already-registered multidimensional data by searching for the obtained character strings in the multidimensional index data stored in the storage device, and makes the obtained storage location information resultant candidates.

11. The multidimensional data management system according to claim 8, wherein the storage device stores a plurality of already-registered multidimensional data that further include physical quantities, and the central processing unit that executes programs stored in the memory:

obtains the ranges of the respective values of a plurality of dimensions defined in the multidimensional management data stored in the storage device within which the ranges of the values of dimensions included in a search condition fall respectively;

obtains character strings associated with the obtained ranges of the respective values of the plurality of dimensions in the multidimensional management data;

obtains a plurality of pieces of the storage location information of already-registered multidimensional data by searching for the obtained character strings in the multidimensional index data stored in the storage device;

obtains a plurality of already-registered multidimensional data on the basis of the plurality of pieces of the storage location information; and determines whether the values of dimensions included in the plurality of obtained multidimensional data pieces are equal to each other or not, and determines that arbitrary two multidimensional data pieces are similar to each other on the basis of the physical quantities included in multidimensional data that are determined to be equal to each other.

12. A multidimensional data management method for a computer comprising a central processing unit and a memory, the method executed by the central processing unit, comprising the steps of:

storing multidimensional data including respective values of a plurality of dimensions wherein each value is a real number, and multidimensional management data storing a plurality of records, each record indicating one of the plurality of the dimensions stored in the multidimensional data and including a minimum value, which is a real number, a maximum value, which is a real number, and an associated character string;

obtaining the respective values of the plurality of dimensions included in the multidimensional data;

for each value of each of the obtained respective values of the plurality of dimensions stored in the multidimensional data, identifies a record, among the plurality of records of the multidimensional management data, having the minimum value less than the value of the respective dimension and having the maximum value greater than the value of the respective dimension;

obtaining, for each of the plurality of dimensions, the character string associated with the identified record;

coupling two or more of the obtained character strings for each of corresponding two or more of the plurality of dimensions; and associating the coupled character strings with each multidimensional data, and stores each multidimensional data with the coupled character strings as registered multidimensional data.

* * * * *